United States Patent [19]

Silverstone

[11] 4,185,281

[45] Jan. 22, 1980

[54] ARRANGEMENT FOR SELECTING A DESIRED DATA DISPLAY

[75] Inventor: Derek M. Silverstone, Southend-on-Sea, England

[73] Assignee: Elliott Brothers (London) Limited, Chelmsford, England

[21] Appl. No.: 802,509

[22] Filed: Jun. 1, 1977

[30] Foreign Application Priority Data

Jul. 30, 1976 [GB] United Kingdom ............... 31900/76

[51] Int. Cl.[2] ................................................ G06F 3/14

[52] U.S. Cl. .................................... 340/706; 340/709; 340/711

[58] Field of Search ............... 340/324 R, 336, 378 R, 340/379, 325, 168 S, 706, 709, 711

[56] References Cited

U.S. PATENT DOCUMENTS

| | | | |
|---|---|---|---|
| 1,054,336 | 2/1913 | Brown | 340/337 |
| 3,526,887 | 9/1970 | Erni | 340/379 |
| 3,684,870 | 8/1972 | Nelson | 340/378 R |

FOREIGN PATENT DOCUMENTS 2319437 10/1973 Fed. Rep. of Germany .

*Primary Examiner*—Marshall M. Curtis

*Attorney, Agent, or Firm*—Diller, Ramik & Wight

[57] ABSTRACT

A display arrangement having a plurality of data display areas in which data is entered via manual controls is provided with a visual indication of the display element or area addressed. A first control knob selects the area addressed and a second control knob allows alteration of the data at the addressed area. The invention is primarily intended for "one handed" operation in which the manual controls are out of the line of sight of the operator.

11 Claims, 1 Drawing Figure

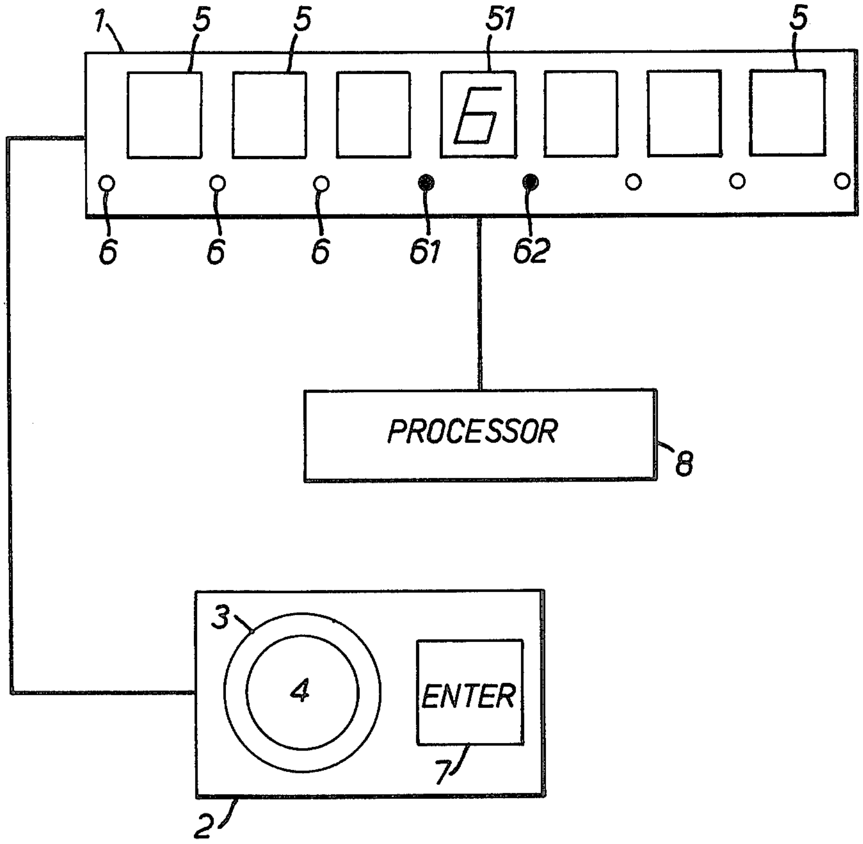
1
5
5
51
5
6
6
6
6
61
62
PROCESSOR
8
3
4
ENTER
7
2

ARRANGEMENT FOR SELECTING A DESIRED DATA DISPLAY

This invention relates to display arrangements, and is suited for use with a data interface.

According to this invention a display arrangement includes a plurality of display elements, manually operable means for altering the data displayed in any one of the display elements, manually operable means for selecting the display element to be altered and a visual indicator associated with each display element for indicating which display element has been selected.

Although the invention may be used merely for display purposes it is primarily intended for use with an input-output interface for a processor, and preferably each display element is a numeric digital display device, such as a light emitting diode array which can indicate any of the digits 0 to 9.

Where the display arrangement is used as or with a data interface, preferably further manually operable means are provided to enter the data displayed into the processing means when it has been visually checked by the operator.

The invention is particularly suited for use in an aircraft or helicopter cockpit, in which case the plurality of display elements would be located remotely from the manually operable means, the display elements being positioned so as to be readily viewed by a pilot with little head movement, whereas the manually operable means normally would be arranged for convenience of hand operation.

The visual indicator means may take many forms, but where a conventional line array of digital display elements are used, advantage can be taken of the decimal point usually provided between each pair of elements to indicate the element selected.

Preferably, the two decimal points bracketing a selected element are energised to provide a visual indication.

Preferably again, the two decimal points are pulsed so as to flash on and off regularly. Such a visual indication immediately draws attention to itself and can be identified by a quick glance.

Where a display arrangement is used which does not possess a decimal dot facility, the selected element can be identified in other ways, for example by brightening up the selected element or causing it to flash regularly on and off, but these alternatives are not preferred.

The manually operable means are, preferably, adapted for one-handed operation, and preferably again, the manually operable means for altering the data displayed, and the manually operable means for selecting the display element to be altered are concentric rotatable knobs. Alternatively, they may be adjacent thumb wheels for example, but the concentric knobs are particularly suitable for use in an aircraft cockpit as they can readily be located and operated without ambiguity simply by feel. Preferably, the means for entering the data displayed comprises an illuminated push button mounted adjacent to the concentric knobs.

The display arrangement can be addressed using only the two control knobs and the only limit on the number of digits is that provided by the number of display elements available. The controls can, therefore, be provided in a very compact form, and in a form which takes very much less space than the keyboards which are sometimes used in aircraft cockpits. Furthermore, unlike a keyboard, the controls can be operated wholly by feel, and in the preferred embodiment, the various digits which make up the display can be altered in any order; it is not necessary to enter a digital word sequentially from left to right.

The invention is further described, by way of example, with reference to the accompanying drawing which illustrates one embodiment as a display arrangement in accordance with the present invention.

The display arrangement consists of a display unit 1 and a control box 2. The arrangement is particularly suited for use in an aircraft or helicopter cockpit as the display unit 1 can be mounted within the field of view of the pilot, and the control box 2 can be mounted in any convenient position where it falls easily to hand. The control box 2 comprises two concentric rotatable knobs 3 and 4, the outer knob 3 being used to select one of the discrete display elements 5 on the display unit 1. The display unit 1 is of the kind which is provided with decimal point positions 6 between adjacent elements 5, and rotation of the knob 3 energises different pairs of decimal point positions 6. In the drawing the two positions 61 and 62 are shaded to show that element 51 has been selected. When energised the decimal dot positions flash on and off to draw attention to the selected element, and by this means the selected element can be readily identified by a quick glance.

When the correct element 5 has been selected, rotation of the inner knob 4 changes the nature of the data displayed by that element. In the present example, numbers are displayed and an incremental rotation of knob 4 in one direction increases the number displayed from the present '6' by one digit for each increment and rotation in the other direction decreases the number displayed by one for each incremental movement of the knob.

When one element has been set to display a required number, the selector knob 3 is rotated to a different position. The position is indicated by the appropriate flashing pair of dot positions 6 and the knob 4 is rotated until the selected element displays the correct number. When all elements are correct, an adjacent entry push button 7 is pressed to enter the data into a processor system, indicated diagrammatically at 8.

The nature of the processor will depend on the particular application for which the present invention is being used. For example, when the display arrangement is mounted in an aircraft, the processor may be used for navigation purposes. The present location of the aircraft is entered into the display unit 1 as a map reference in digital form, and when the whole reference has been correctly written in, the enter button 7 is pressed to transfer the location into the processor 8. When a destination location is subsequently entered, the processor automatically causes range and bearing data to be displayed on the display unit 1. This is just one example of the possible use of the display system, and it is not necessary for the system to be used in combination with a processor, since for some applications the display of the number manually entered by use of the control knobs 3 and 4 may be all that is required.

It will be appreciated from the foregoing description that any element 5 can be selected in any order. It is not necessary to write-in new information from left-to-right as is the case with keyboards. Furthermore, it is possible to alter just one digit of a display without modifying the remainder. The example illustrated lends itself to one handed operation which makes it suitable for use with light aircraft in which sometimes the operation of controls can be made difficult by violent or unpredictable movement of the aircraft.

The invention is not limited to any particular kind of display unit. The adjacent display elements need not be physically separate, but may be separately addressable locations of an integral larger display.

I claim:

1. A display arrangement which permits an operator of a vehicle such as an aircraft to select data for input to a data processor without requiring the operator to relinquish his normal monitoring and control of the vehicle, said display arrangement having a plurality of display elements disposed within the operator's normal field of view, and including first manually operable means comprising a first member manually movable to any one of a plurality of positions for selectively altering the data displayed in any one of the display elements, second manually operable means comprising a second member manually movable to any one of a plurality of positions for selecting the display element to be altered, and visual indicator means at each display element for indicating which display element is currently selected for alteration said first and second members being disposed outside of said normal field of view.

2. A display arrangement as claimed in claim 1 wherein each display element is a numeric digital display device.

3. A display arrangement as claimed in claim 2 wherein each display element is a light emitting device which can indicate any of the digits 0 to 9.

4. A display arrangement as claimed in claim 1 and wherein it is used in conjunction with processing means, and further manually operable means are provided to enter the data displayed into the processing means when it has been visually checked by the operator.

5. A display arrangement as claimed in claim 1 and wherein a conventional line array of digital display elements constitutes the plurality of display elements, and the decimal point provided between each pair of elements is used to indicate the element currently selected.

6. A display arrangement as claimed in claim 5 and wherein the two decimal points bracketing a currently selected element are energised to provide a visual indication.

7. A display arrangement as claimed in claim 6 and wherein the two decimal points are pulsed so as to flash on and off regularly.

8. A display arrangement as claimed in claim 1 and wherein both the manually operable means are adapted for one-handed operation.

9. A display arrangement as claimed in claim 8 and wherein the first manually operable means for altering the data displayed, and the second manually operable means for selecting the display element to be altered are concentric rotatable knobs.

10. A display arrangement which permits an operator of a vehicle such as an aircraft to select data for input to a data processor without requiring the operator to relinquish his normal monitoring and control of the vehicle, said display arrangement comprising, in combination:

a display unit disposed within the operator's normal field of view having a plurality of display locations and a separate display means at each location for displaying any selected one of a plurality of display characters; and control means for establishing and changing the displays at each location, one at a time, to fill in a composite display depicting a desired sequence of display characters, said control means comprising a first member manually movable to any one of a plurality of positions corresponding respectively to different ones of said display characters for establishing and selectively altering the character at any selected display location in dependence upon the setting of such member, a second member manually movable to any one of a plurality of positions corresponding respectively to different ones of said display locations for selecting a current display location to display that character determined by the concurrent setting of said first means, said first and second members being disposed outside of said normal field of view; and means for visually indicating at said display unit which of said display locations corresponds to the current setting of said second member.

11. A display arrangement which permits an operator of a vehicle such as an aircraft to select data for input to a data processor without requiring the operator to relinquish his normal monitoring and control of the vehicle; said arrangement comprising a display unit disposed within the operator's normal field of view, said display unit having a plurality of display locations and a separate display means at each location for displaying any selected one of a plurality of data display characters; a control console disposed adjacent the normal region of activity of one of the operator's hands whereby the control console is disposed outside of said normal field of vision; first and second rotatable control members grouped on said console for sequential, one-hand manipulation by the operator, said first control member being rotatable to a plurality of set positions corresponding to different ones of the plurality of data display characters for altering the data character display at that display location selected by the second control member, said second control member being rotatable to a plurality of set positions corresponding respectively to different ones of said display locations for selecting that display location which is to be altered; means for uniquely identifying, at said display unit, that display location which corresponds to every current setting of the second control member; and said control console including manually operable means for providing output of the data display as selected by the operator.

* * * * *